Sept. 13, 1955   H. D. HUME   2,717,483
CUTTER BAR FOR SPINACH AND SIMILAR CROPS
Filed Sept. 20, 1954   2 Sheets-Sheet 2

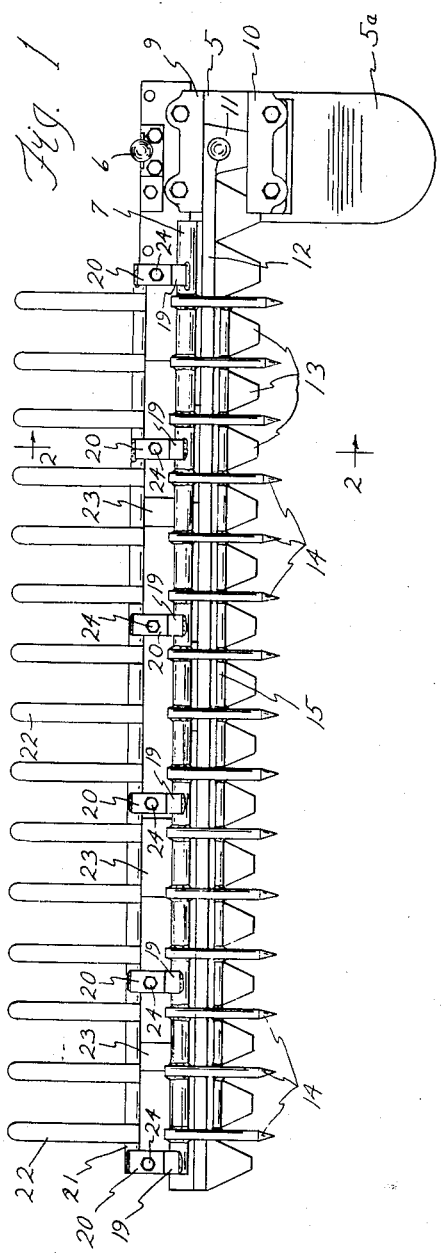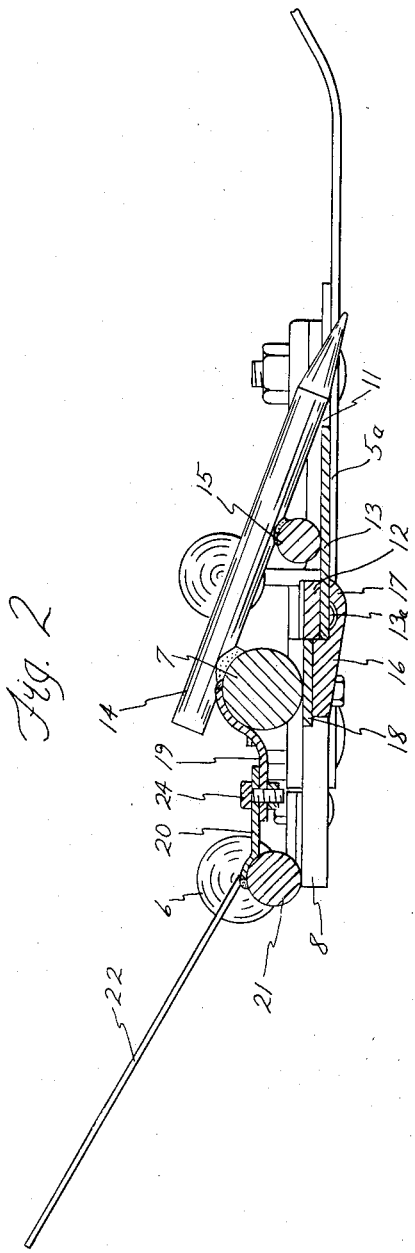

INVENTOR.
Horace D. Hume
BY
Atty.

United States Patent Office 2,717,483
Patented Sept. 13, 1955

2,717,483

CUTTER BAR FOR SPINACH AND SIMILAR CROPS

Horace D. Hume, Mendota, Ill.

Application September 20, 1954, Serial No. 457,105

5 Claims. (Cl. 56—296)

My invention relates to a cutter bar for cutting spinach and similar crops. In the cutting of spinach in particular, a great deal of difficulty is encountered because of the tendency of the cutter bars normally used in this work to pick up and mix dirt with the spinach when cutting. It is the principal purpose of the present invention to provide a cutter bar construction which will cut the spinach at the desired height and avoid mixing dirt into the spinach when it is cutting it by keeping dirt accumulating parts, such as guards and ledger plates, away from the cutting elements of the sickle and elevating the cut leaves over the sickle before and after they are cut.

The nature and advantages of my invention will appear more fully from the following description and the accompanying drawings wherein a preferred form of the invention is shown. It should be understood, however, that the drawings and description are illustrative only and are not intended to limit the invention except insofar as it is limited by the claims.

In the drawings:

Figure 1 is a plan view of a cutter bar embodying my invention;

Figure 2 is an enlarged sectional view taken on the line 2—2 of Figure 1;

Figure 3:
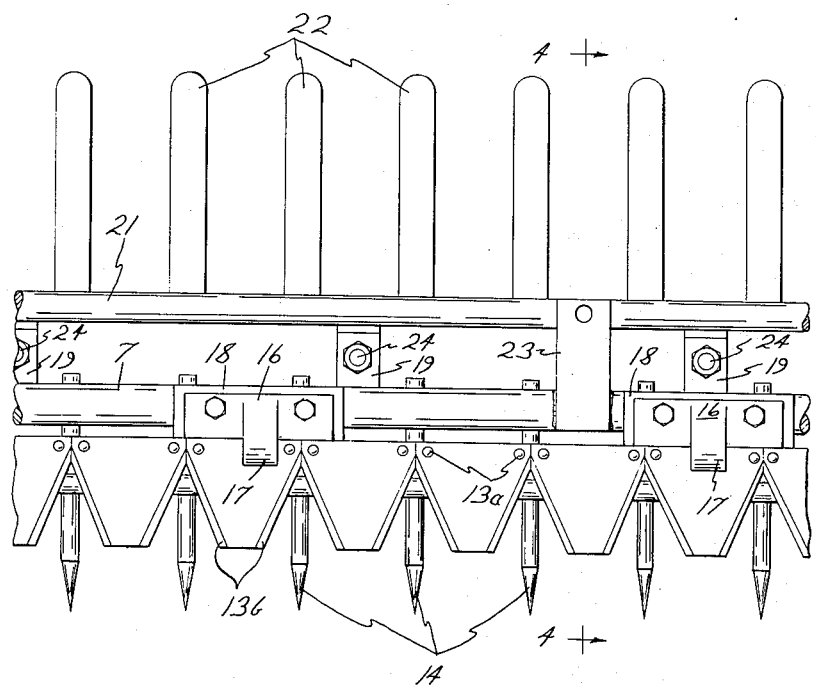
Figure 3 is an enlarged bottom plan view of a portion of the cutter bar.
Figure 4:
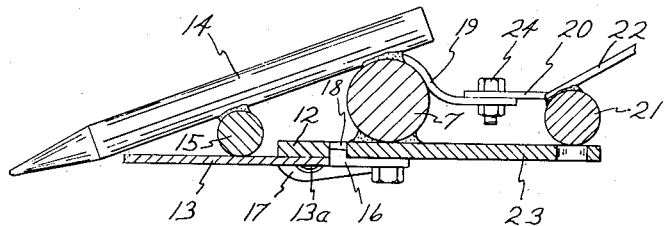
Figure 4 is a sectional view taken on the line 4—4 of Figure 3.

Referring now to the drawings, my invention utilizes a cutter bar which is carried in the present instance by a shoe 5. This shoe 5 has a mounting ball 6 bolted thereto at the rear end. A main supporting bar 7 is fixed to a heavy transversely running back section 8 of the shoe. Sickle guards 9 and 10 are bolted on the shoe 5 to guide the driving end 11 of the sickle 12 which carries the cutting sections 13. The shoe 5 includes a wear plate 5a which is turned up at its forward end as illustrated. The main bar 7 may be of any suitable cross sectional shape but is shown in the present instance as a round shaft. This bar 7 has a plurality of pointed fingers 14 welded thereto. The fingers 14 extend forwardly and downwardly over the front ends of the sections 13. These fingers carry a rod or bar 15 that overlies the sections 13 in front of the sickle 12. The sickle 12 is supported from beneath by spaced clips 16 which are bolted to the main bar 7. The clips 16 have guide shoes 17 extending forwardly beneath the sickle 12 and bearing on the sections 13 immediately in front of the rivets 13a that secure the sections to the sickle 12. The clips 16 have a plate 18 on top of them and this plate bears directly on the bar 7. The plate 18 is slightly longer than the clip 16. The back surface of the sickle 12 abuts the front faces of the clips 16 and plates 18. Between the several plates 18 there is a space between the back surface of the sickle and the main cutter bar 7 to pass any small particles that are carried over the sickle 12.

The bar 7 also carries a plurality of mounting lugs 19 that extend rearwardly from the bar 7 and serve as a means of mounting corresponding lugs 20 on a bar 21 that carries elevating fingers 22. The bar 21 is further supported by a series of plates 23 that are welded to the bar 7 and extend rearwardly beneath the bar 21. Bolts 24 secure the lugs 19 and 20 together.

It will be noted that the sickle sections 13 have their cutting edges in the plane of the top surface thereof with the bevelled faces 13b facing downward. The fingers 14 extend beyond the forward ends of the sections 13 and are pointed so as to get under and pick up the spinach leaves before they are encountered by the sections 13. The sections 13 then cut the leaves and the leaves pass on up the fingers 14 and over fingers 22 where these fingers are employed. In some instances some other pick up mechanism may be employed behind the bar 7.

It will be observed that there is no device beneath the cutting edges of the sickle sections 13, to stir up dirt into the spinach leaves as they are cut off. The rod 15 acts as a guide at the base of the cutting edges of the sections 13 to keep the sections from engaging the fingers 14. Any dirt that may be caught on the sickle sections 13 is free to fall off between the sickle 12 and the bar 7. The long upwardly slipping fingers 14 which carry the rod 15 provide a means for elevating the cut leaves while permitting any dirt to fall down and escape. The fingers 14 are in a row and are spaced apart a distance equal to the width of a section 13. With this construction the leaves are held up as they are cut by the fast moving sections. The fingers 22 are spaced apart about the same distance as the fingers 14 so that when the cut leaves are delivered to them from the fingers 14, the fingers 14 can carry the leaves rearwardly.

It is believed that the nature and advantages of my invention will be clear from the foregoing description.

Having thus described my invention, I claim:

1. A cutter bar for spinach and similar crops comprising a main support bar, a front guide bar spaced from and parallel to the main support bar, sickle support clips spaced apart and secured to the under side of said main support bar and having forwardly facing surfaces to engage and guide a sickle along a path spaced in front of and parallel to the main support bar, said clips having guide shoes thereon extending forwardly to engage and support sickle sections, and a row of pointed lift fingers rigidly affixed to said main support bar and extending forwardly and downwardly over the front guide bar substantially to the level of said guide shoes, the fingers being secured to said front guide bar.

2. The structure defined in claim 1 together with a rear bar spaced behind the main support bar and carried thereby and fingers on the rear bar extending rearwardly and upwardly therefrom.

3. A cutter bar for spinach and similar crops comprising a main support bar, a front guide bar spaced from and parallel to the main support bar, sickle support clips spaced apart and secured to the under side of said main support bar and having forwardly facing surfaces to engage and guide a sickle along a path spaced in front of and parallel to the main support bar, said clips having guide shoes thereon extending forwardly to engage and support sickle sections, a sickle having cutting sections thereon riding on the shoes and engaging the front guide bar, and a row of pointed lift fingers rigidly affixed to said main support bar and extending forwardly and downwardly over the front guide bar substantially to the level of said guide shoes, the fingers being secured to said front guide bar.

4. The structure defined in claim 3 together with a rear bar spaced behind the main support bar and carried thereby and upwardly and rearwardly extending fingers carried by said rear bar.

5. A cutter bar for spinach and similar crops comprising a main support bar, a front guide bar spaced from and parallel to the main support bar, sickle support clips spaced apart and secured to the under side of said main support bar and having forwardly facing surfaces to engage and guide a sickle along a path spaced in front of and parallel to the main support bar, said clips having guide shoes thereon extending forwardly to engage and support sickle sections, a sickle having cutting sections thereon riding on the shoes and engaging the front guide bar, and a row of pointed lift fingers rigidly affixed to said main support bar and extending forwardly and downwardly over the front guide bar substantially to the level of said guide shoes, the fingers being secured to said front guide bar, and spaced apart a distance substantially equal to the width of a sickle section.

No references cited.